United States Patent
Gysi et al.

(10) Patent No.: US 7,810,377 B2
(45) Date of Patent: Oct. 12, 2010

(54) METHOD AND DEVICE FOR TESTING THE SEALING TIGHTNESS OF TEAR-OFF LIDS

(75) Inventors: Peter Gysi, Bellikon (CH); Marcel Oberholzer, Kindhausen (CH)

(73) Assignee: Soudronic AG, Bergdietikon (CH)

( * ) Notice: Subject to any disclaimer, the term of this patent is extended or adjusted under 35 U.S.C. 154(b) by 755 days.

(21) Appl. No.: 11/577,387

(22) PCT Filed: Oct. 12, 2005

(86) PCT No.: PCT/CH2005/000597

§ 371 (c)(1),
(2), (4) Date: Apr. 17, 2007

(87) PCT Pub. No.: WO2006/042426

PCT Pub. Date: Apr. 27, 2006

(65) Prior Publication Data

US 2009/0044601 A1    Feb. 19, 2009

(30) Foreign Application Priority Data

Oct. 19, 2004    (CH)    ............................ 1723/04

(51) Int. Cl.
     *G01M 3/26*      (2006.01)
(52) U.S. Cl. ................................................. 73/40
(58) Field of Classification Search ............... 73/38, 73/40, 49.3, 49.8
See application file for complete search history.

(56) References Cited

U.S. PATENT DOCUMENTS

| | | | | |
|---|---|---|---|---|
| 2,696,107 A | * | 12/1954 | Blaing-Leisk | ............... 73/45.2 |
| 2,861,451 A | | 11/1958 | Emmons, III | |
| 3,499,314 A | * | 3/1970 | Riddell et al. | ................ 73/45.2 |
| 3,712,112 A | | 1/1973 | Widmer, et al. | |
| 3,875,789 A | * | 4/1975 | Orosy | ............................ 73/40 |
| 3,875,790 A | * | 4/1975 | Herdzina et al. | ............... 73/40 |
| 3,954,003 A | * | 5/1976 | Dobbins | ......................... 73/40 |
| 4,055,984 A | * | 11/1977 | Marx | ......................... 73/40.7 |
| 4,440,016 A | * | 4/1984 | Konagaya et al. | .............. 73/40 |
| 4,495,797 A | * | 1/1985 | Cassell et al. | ................... 73/40 |
| 5,042,289 A | * | 8/1991 | Jensen | ........................... 73/40 |
| 5,668,307 A | * | 9/1997 | Wade | ......................... 73/40.7 |
| 6,014,891 A | * | 1/2000 | Kirks | ............................. 73/40 |

FOREIGN PATENT DOCUMENTS

JP      59-147234      8/1984

OTHER PUBLICATIONS

International Search Report of PCT/CH2005/000597.

* cited by examiner

*Primary Examiner*—John Fitzgerald
(74) *Attorney, Agent, or Firm*—McCormick, Paulding & Huber LLP

(57) ABSTRACT

In a linear transport device (30) for tear-off lids (20), the latter are tested for the impermeability of the seal and the foil in a test device (9) that is integrated into the linear transport device. The lid is fixed between a pressure chamber (43) and a measuring chamber (47, 48, 49) in an airtight manner and a test pressure is applied to the lid from the underside. An air-permeable support (47) in the measuring chamber exerts pressure on the upper face of the lid and any increase in air pressure in the measuring chamber caused by a degree of permeability is detected and evaluated by a sensor (55). A burst test can be carried out in the same test device.

19 Claims, 7 Drawing Sheets

METHOD AND DEVICE FOR TESTING THE SEALING TIGHTNESS OF TEAR-OFF LIDS

CROSS REFERENCE TO RELATED APPLICATION

This application claims the priority of Swiss Patent Application No. 1723/04, which was filed 19 Oct. 2004 and the entire disclosure of which is incorporated herewith by reference.

BACKGROUND

The invention concerns a method for testing the sealing tightness of a tear-off lid and an apparatus for testing the sealing tightness of tear-off lids. The invention further concerns a use of the method and a use of the apparatus.

STATE OF THE ART

It is known to provide lids or covers, for cans or other canister-like packages, as metal covers permanently fastened to the upper sides of the packages, which covers form an access opening which up to the time of the first use of the package contents is closed by a tear-off foil, especially a metal foil, applied by heat sealing. An additional plastic cover arranged over the metal cover makes the package reclosable during the useful life of the package contents. Processing apparatuses for the making of such metal covers are explained in more detail in the following with the assistance of FIG. 1 and FIG. 9. FIGS. 2 to 8 serve for the explanation of the steps involved in the making of such covers.

SUMMARY OF THE INVENTION

The basic object of the invention is to enable the determination of the sealing tightness of tear-off covers in a simple way within the cover manufacturing line. A further basic object of the invention is to make available a rapidly acting, simple operating, and space saving apparatus, integratable into a manufacturing line for testing the sealing tightness of covers.

This object is solved by a method of testing in which a space below the cover is pressurized and an increasing pressure due to leakage is detected in a measuring space above the cover, and by the apparatus having a pressure space and a pressure measuring space, between which the cover is tightly received, and a pressure sensor connected with the measuring space to produce an evaluatable signal corresponding to the pressure in the measuring space.

By the loading from below and the measuring from above, of the sides of the tear-off foil, a compact arrangement is possible which is especially well suited for use in a purely linear cover manufacturing line.

Preferred is an embodiment of the method or of the apparatus which results in a supporting of the tear-off foil on its measuring space side so as to make possible a relatively high test pressure without the danger of bulging the tear-off foil, and thereby permitting a rapid leak recognition within the linear transport path of the covers. As to this a supporting is preferred which essentials props the entire surface of the tear-off foil, for which advantageously a microporous, good air permeable material is used. This material largely or entirely fills up the measuring space portion lying adjacent to the tear-off foil so that a small measuring space volume exists and so that therefore the reception of a small amount of air into the measuring space leads to a well detectable air pressure increase.

Further preferably, if with same pressure space a burst test is also to be carried out, the burst test can also be executed within the same cover manufacturing system. For this purpose, the measuring space can be increased to allow a bulging of the tear-off foil under the bursting pressure. The bursting pressure is preferably measure with the same sensor as used for the sealing tightness test.

BRIEF DESCRIPTION OF THE DRAWINGS

In the following the making of tear-off covers and exemplary embodiments of the invention are described with the help of the drawings. The drawings are.

DESCRIPTION OF THE PREFERRED EMBODIMENTS

Figure 1:
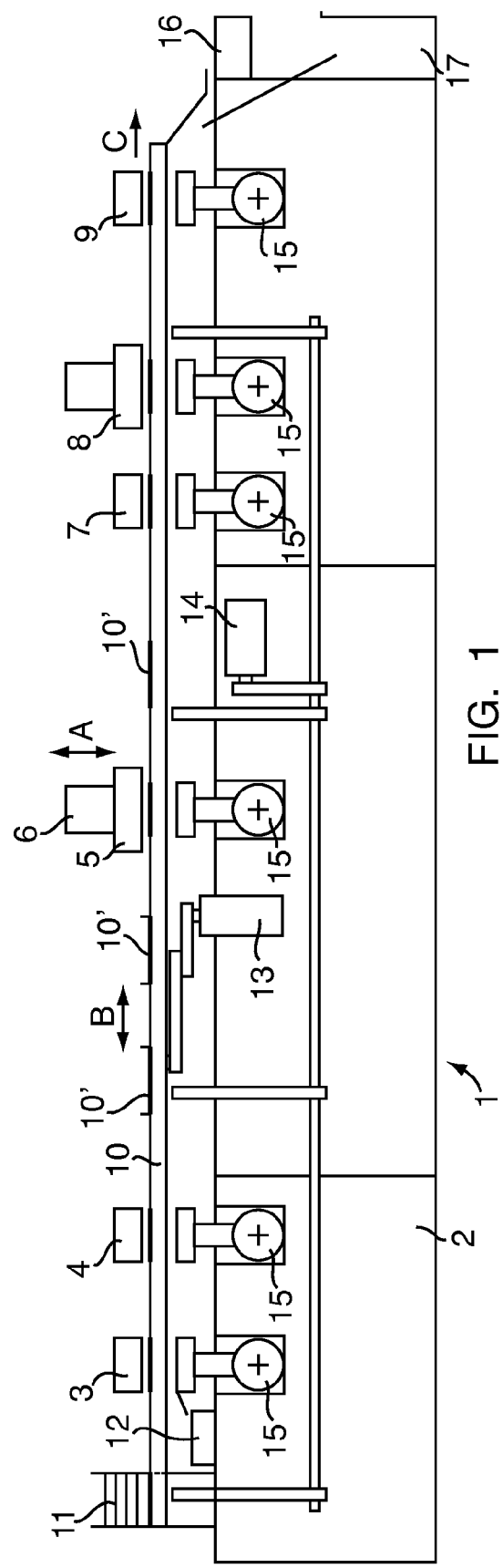
FIG. 1—a schematic side view of an apparatus for the conveying and making of covers.

With the help of FIGS. 1 to 8 the state of the art concerning processing apparatus and manufacturing steps for the making of metal covers with a tear-off foil is briefly explained. FIG. 1 shows a schematic side view such an apparatus 1 which on a machine frame 2 has several processing stations 3 to 8 as well as a further station 9. A conveyor device 10, 13, 14 moves objects in the forward direction, which is indicated by the arrow C, from a stack 11 at the starting end of the device to the other end of the device where the objects by way of chutes are moved into the repositories 16, 17. The objects are taken from the stack 11 in a known way and are put onto the conveyor device. This device has two long rails 10 arranged respectively at the opposite sides of the objects, which rails let the objects, lying on supports 10' at the stations 3 to 9 move upwardly in the direction A upon the rising of the rails 10 by means of a drive 14. Then by a crank drive 13, the rails and the objects now carried by the rails are moved forwardly in the direction of the arrow B (directed in the same direction as the arrow C) by a given step amount.

Thereafter the rails are lowered downwardly in the direction of the arrow A so that the cover parts or covers are again returned to their supported positions. Then the rails 10 are moved rearwardly in the direction of the arrow B oppositely to the arrow C below the supported positions of the covers, and then the described process is carried out again. The cover parts or covers rest between the transport at their supported positions or are located at the processing stations and are there at processed. After the processing steps of all the processing stations have been completed, a new forward movement takes place.

Figure 2:
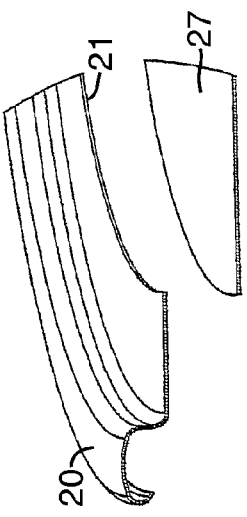
FIGS. 2 to 8—sections of metal covers for explaining their manufacture.

FIG. 2 shows a stack of metal cover blanks 20 as an example of the cover parts which are provided in the stack 11. These blanks are, for example, round metal disks of, for example, 11 cm. diameter. Of course, other basic forms are possible without ado, for example, square or rectangular disks and disk of other diameters or sizes. The blanks 20 have already been formed in a non-illustrated processing machine at their edges as shown in FIG. 2. In FIG. 2 and in the following FIGS. 3 to 8, only a section of the entire disk is illustrated in order to simplify the drawings.

Figure 3:
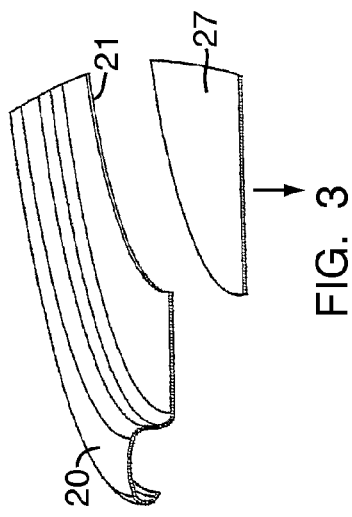

In the first processing station 3 of FIG. 1 by way of a stamping process using upper and lower work tools an opening is stamped into the disk, which opening is visible in FIG. 3 where the edge of the opening is indicated at 21 and the stamped out round disk is indicated at 27. This disk 27 proceeds as waste into the container 12 of FIG. 1. The stamping station 3—as is the case also for the subsequent stations—is driven by a drive 15.

Figure 4:
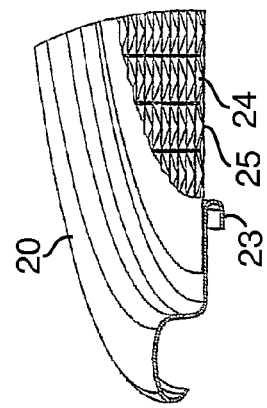

In the processing station 4 the edge 21 is drawn downwardly to create the flange illustrated at 22 in FIG. 4.

Figure 5:
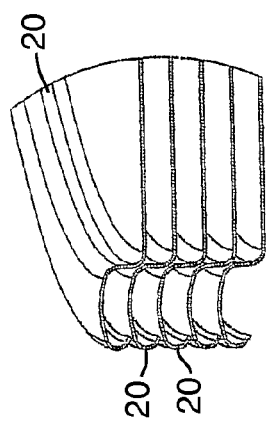
Figure 6:
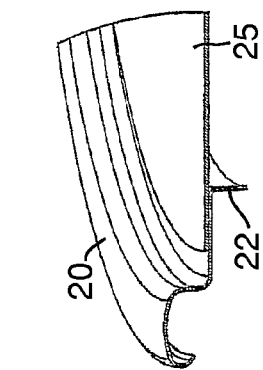
Figure 7:
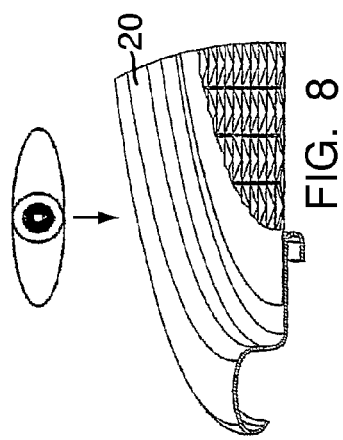
Figure 8:
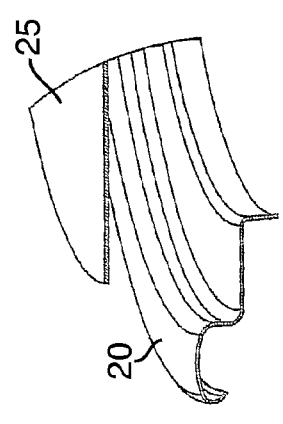

The annular cover blank 20 is now transferred to the processing station 5 in which a foil 25 is placed over the opening of the cover and is fastened thereto by heat sealing, as shown in FIGS. 5 and 6. The metal foil 25 for this is provided in a known way with a plastic material layer on its underside. The needed round foil blank 25 as a rule is stamped from a wide foil strip in station 5 and is placed in the middle recess of the annular disk. By means of a heat-sealing station, the foil under the effect of heat is pressed onto the edge of the round recess of the blank 20 so that the foil 25 becomes tightly connected with the metal cover by melting and subsequent cooling of the plastic layer. This is known and need not be described in more detail here. In any event, for the cooling a cooling processing station 7 can be provided.

In the processing station 8, the foil is provided with an embossing 24 (FIG. 7), and the flange 22 is beaded into the finished edge 23.

In a test station 9 the now finished cover is subjected to a testing process which as a rule includes a sealing tightness test for the tear-off foil 25 applied to the cover, as explained in more detail hereinafter. If the foil is found to be tightly fastened to the remainder of the metal cover the cover is moved into the receiver 16 for finished covers. If a leaking condition is found, the covers move by way of the other illustrated chute into the waste container 17.

Figure 9:
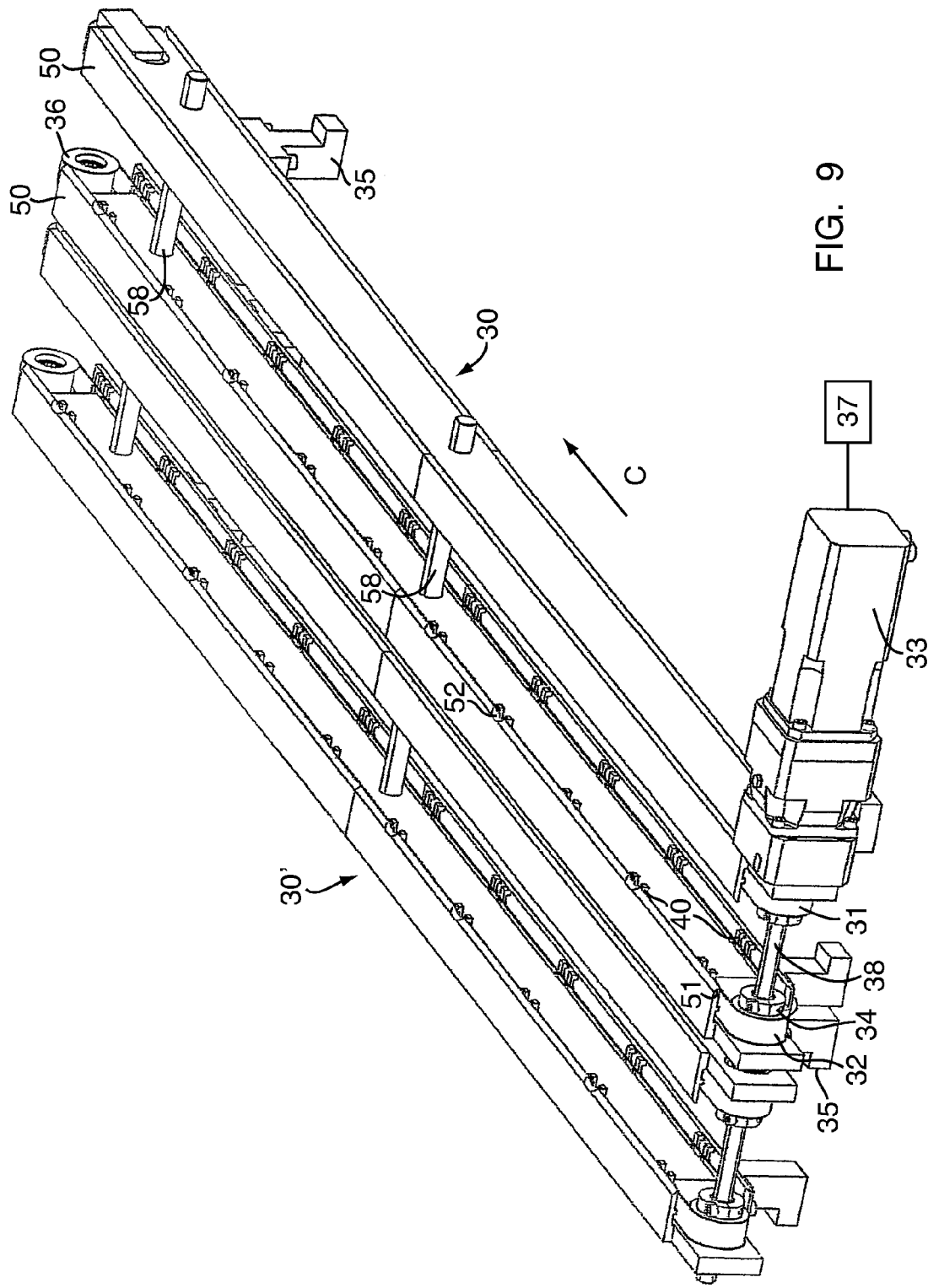
FIG. 9—a further preferred embodiment of a conveyor device.

FIG. 9 shows in perspective view a conveyor device 30 according to one embodiment of the invention. This conveyor device 30 is designed for the transport of cover shaped objects of the depicted kind. The conveyor device serves again for the stepwise advancement of the cover parts or covers to the individual processing stations, which preferably are processing stations for the making of covers as previously described, and to the testing station 9. These stations are not shown in FIG. 9 and it will be clear to specialists in the art as to how they can be arranged along the length of the conveyor device to carry out the involved processing. In FIG. 9 is shown a further conveyor device 30' arranged next to the conveyor device 30. These two conveyor devices can be driven in common by the same drive 33, 37 or each can be provided with its own drive. Additional conveying devices can be provided in the same way in order to increase the total count of the cover parts or covers conveyed. With the illustrated conveyor device 30 the cover parts or covers can be conveyed at higher rates of, for example, 200 objects per minute and with reproducible partial steps between the processing stations. Further, it implements a flexible concept for accommodating a large format range of the objects or covers, so that in the case of round covers, for example, their diameters can range from 50 to 200 mm, and the covers can have diverse rectangular shapes such as those, for example, for much wanted fish packing cans. The conveyor device is further designed as a compact module which can be used for a one track installation or, as shown, for a multiple track installation.

In the illustrated preferred embodiment the conveyor device has two toothed belts 31 and 32 which especially with their upper surfaces lie in the same plane, and therefore run in a coplanar manner, and which at the beginning and end of the conveyor device are guided over end rolls 34, 36 so that an endless toothed belt drive results having the length needed for the number of processing stations involved, the stepwise toothed belt movement is effected by a stepping motor or by a servo motor synchronized with the processing stations, which motor drives the tooth belts by tooth rollers as can be seen in the Figure for the motor 33 and the drive axle 38. In cases where one or more further conveyor devices, such as the conveyor device 30', is or are provided, their toothed belts can be driven by the same motor through additional drive axles or each conveyor device can have its own drive motor. The motor 33 is controlled by a controller 37 to perform the stepwise forward movement of the toothed belts, which control 37 is either a complete control for the entire cover manufacturing apparatus and which also controls the processing stations, or the control 37 can be a dedicated control for controlling only the conveyor device and which communicates and cooperates with an over-ranking control for the cover manufacturing apparatus.

The motor 33 and the associated drive components for the toothed belts are arranged on a machine frame 35 which in the figure is indicated only by its feet 35. Drive tongues are fastened to the toothed belts, which tongues are indicated generally at 40 in FIG. 9, with each pair of oppositely lying drive tongues of the two toothed belts 31 and 32 forming a receiver for an object to be conveyed. By the toothed belt movement, these objects are moved by the driving tongue 40 formed receivers along the transport path and in the direction of the illustrated arrow C from the input side of the conveyor device where the motor is located, to the output side at the end roll 36. In the illustrated embodiment, a cover 50 is provided for each of the two toothed belts and its drive tongues, each of which covers its associated toothed belt and a portion of each of its drive tongues as will be explained in more detail hereinafter. In the region of the processing stations, these covers 50 each have a recess 52 which permits a removal of a conveyed object from the drive tongues so that the object can be lifted from the drive tongues and processed in the associated processing station and subsequently can be returned to the drive tongues for driving between the processing stations. As a rule, no recesses are provided between the processing stations so that a lifting of the objects from the drive tongues is blocked by the covers 50. Additionally or in place of the blocking of the lifting by way of the cover 50, the drive tongues can also be designed to be magnetic, which likewise hinders a lifting of the objects during the advancement steps, if the objects are at least partially or entirely made of a magnetically holdable material.

It is preferred that the lateral spacing of the toothed belts 31 and 32 from one another is adjustable so that thereby the spacing of the opposed driving tongues 40 on the two toothed belts is adjustable to adapt the conveyor device to different sizes of objects. For this, in the conveyor device transverse connectors 58 can be provided which permit a simple adjustment of the spacing of the toothed belts from one another. Correspondingly the drive shafts or axle 38 is designed to permit this spacing adjustment. The spacings of the drive tongues 40 on each toothed belt are given by the number and even distribution of the tongues and their fasteners on the toothed belts. This spacing for the accommodation of the particular size of the objects can preferably be changed in that the existing toothed belts are exchanged for a set of other toothed belts with a different spacing from one another of the drive tongues which are fastened to them. In this way, by adjusting the spacing of the toothed belts relative to one another and by the substitution of toothed belts with differently spaced drive tongues, the desired size of receiving areas to accommodate the objects is achieved. In this way, a change over of all drive tongues for different sizes of objects can take place simultaneously and in a simple and fast manner.

The explained manufacturing steps for the tear-off cover and the associated conveyor device and processing stations are to be understood as only preferred examples and to serve as a help to the understanding of the following described sealing tightness testing of tear-off covers according to the present invention. This testing of course can also apply for tear-off covers which differ from the explained manufacture and which are to be tested. Also, the testing apparatus according to the present invention can be used for other apparatuses for the making of tear-off covers.

Figure 10:
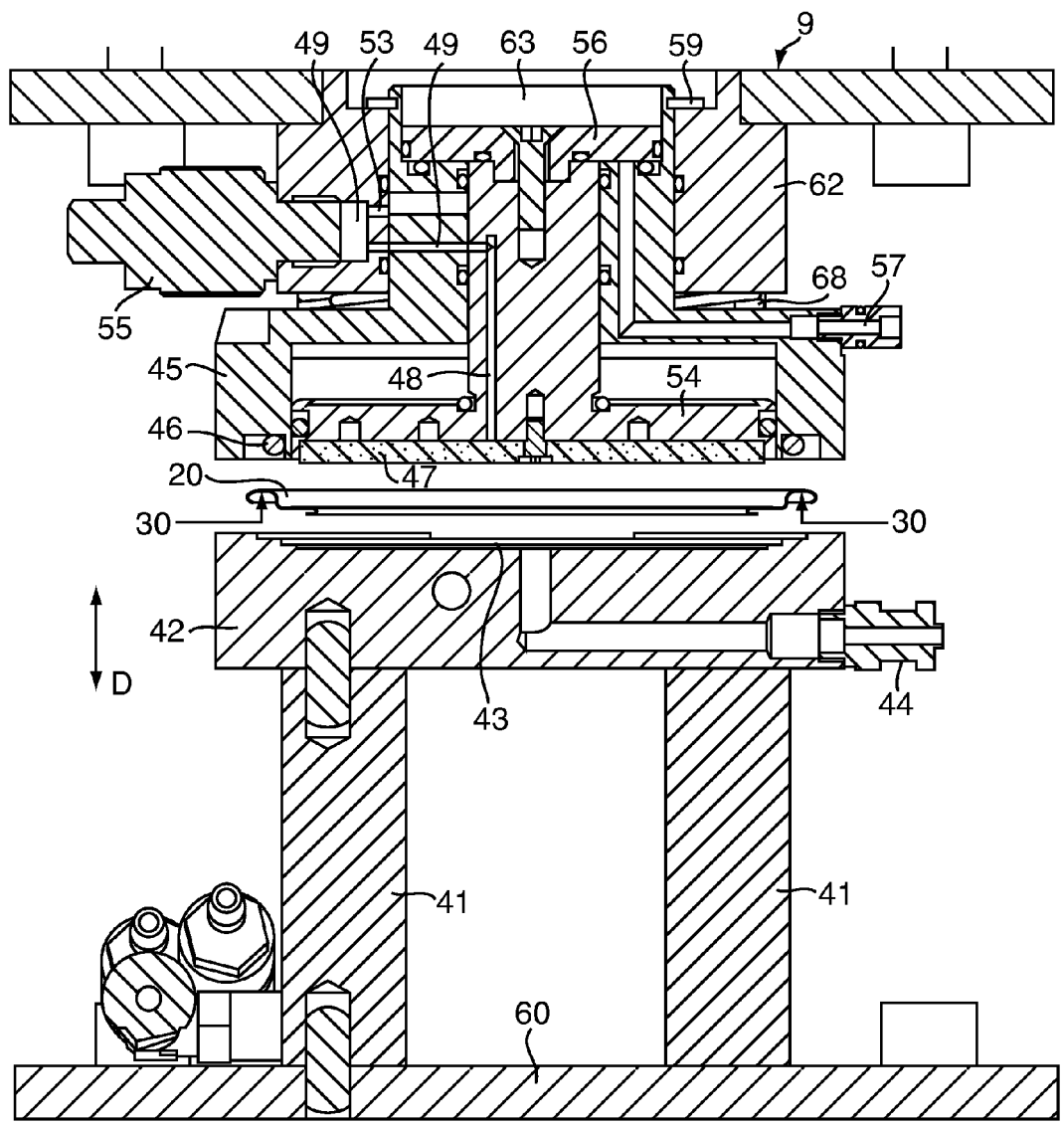
FIG. 10—an embodiment of an apparatus for the sealing tightness testing according to present invention in vertical section representation.
Figure 11:
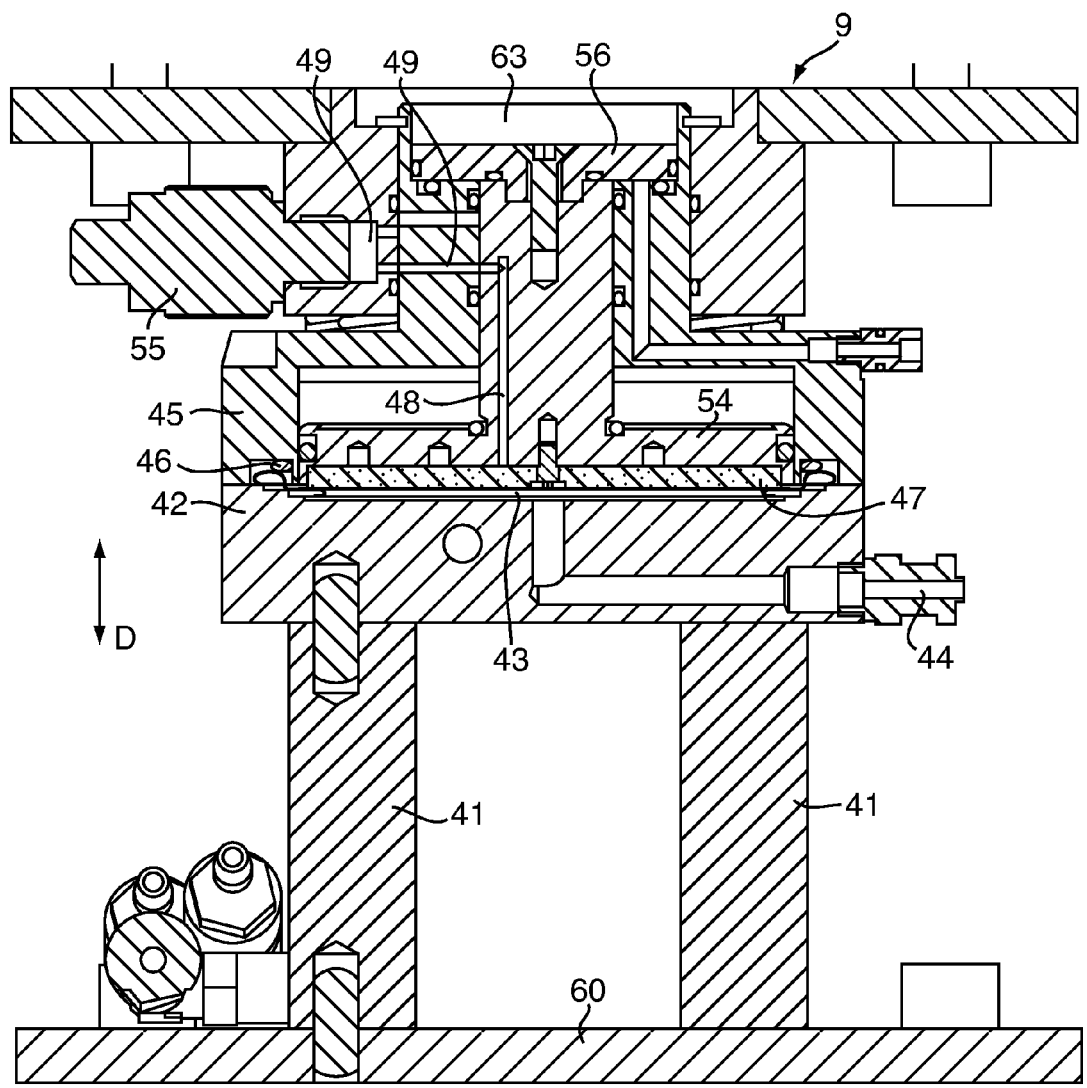
FIG. 11—the apparatus according to FIG. 10 in the position for carrying out the measurement.
Figure 12:
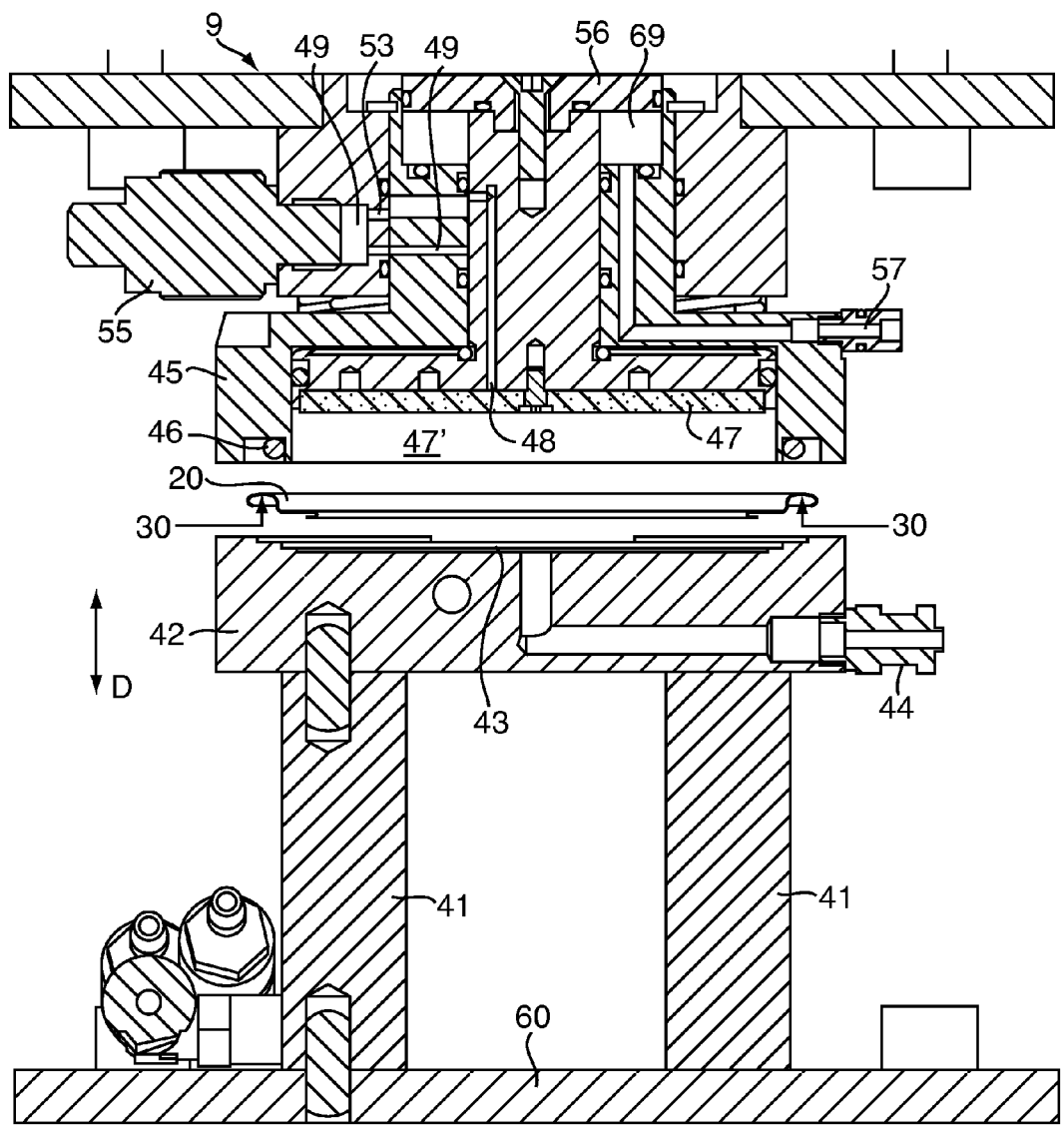
FIG. 12—the apparatus according to FIG. 10 in a position for receiving a cover for the burst testing.
Figure 13:
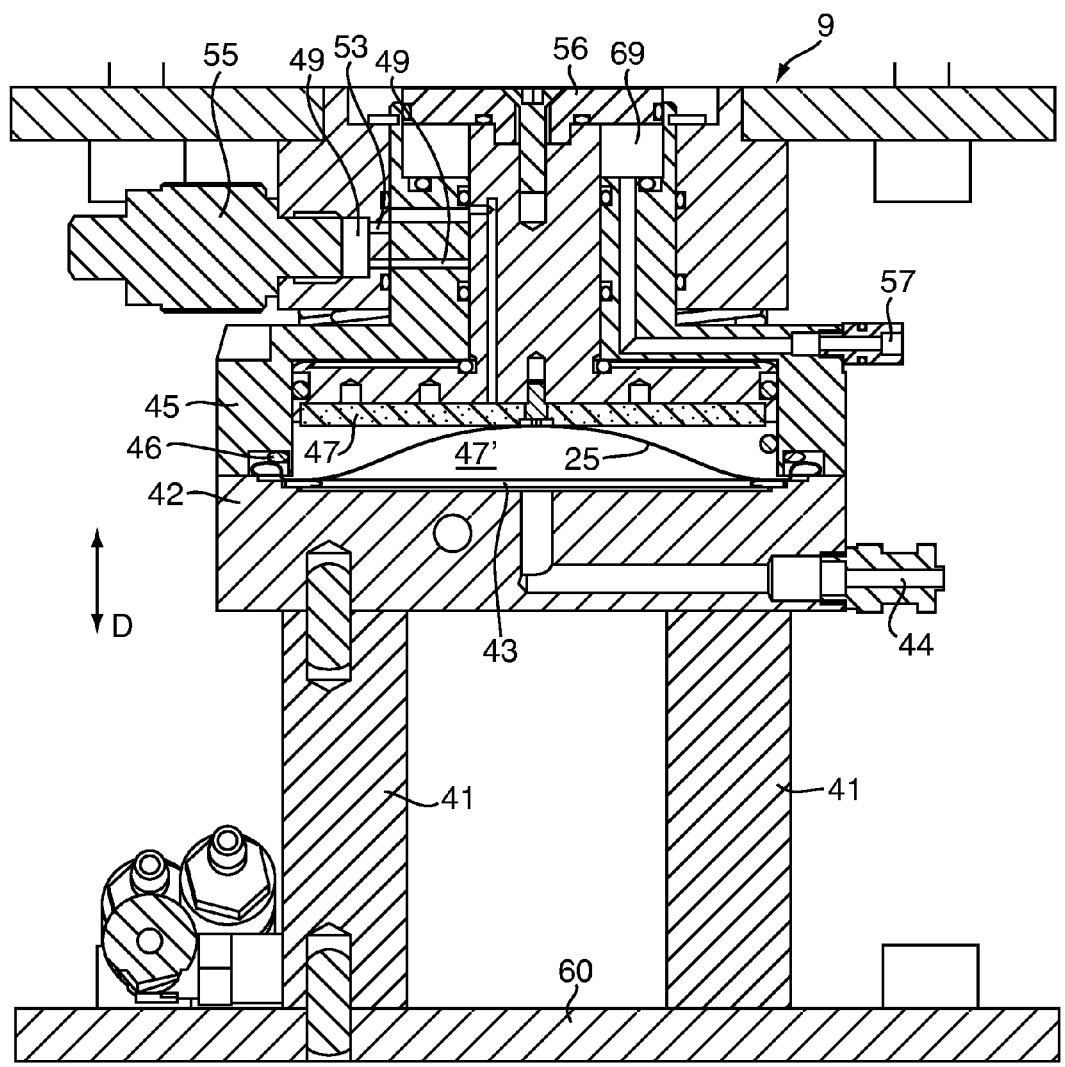
FIG. 13—the apparatus according to claim 10 during the carrying out of the burst test.

FIG. 10 now, together with the further FIGS. 11, 12, and 13, shows a testing device 9 which can form the test station 9 of FIG. 1 or which in the case of the linear conveyor device 30 or 30' can be provided as the testing station. FIGS. 10 and 11 show the procedure for a normal pressure testing in which the sealing tightness of the heat seal seam for the foil or the sealing tightness of the foil itself is tested. As leaking covers are detected, they can be ejected by way of the mentioned chute into the waste container 17. The apparatus 9 is arranged on a frame 60 which can be the machine frame of the conveying device for the covers or which can be a separate frame. To this frame is fastened the lower part 42 of a cover receiver 42, 45 with the lower part being movable vertically as to its elevation, which is indicated in the Figure only by the arrow D and by means of the columns 41. In the position shown in FIG. 10 the lower part 42 of the cover receiver is at its lowermost dead point so that a cover 20 can be inserted into the testing device by the conveyor device. This is indicated only by the two arrows 30, which are to represent that the cover 20 has been inserted into the testing device for the testing station 9 by the conveyor device 30. This of course can also mean either a conveyor device according to FIG. 1 or some other conveyor device. Therefore, according to the cycle time of the conveyor device the cover 10 then remains in the testing device and is not transported further in the conveying direction, so that during this predetermined time, the sealing tightness testing can be carried out. For this purpose, the cover 20 is taken into the cover receiver 42 and 45 in an airtight manner, which means that in the illustrated example, the lower part 42 moves upwardly in the direction of the arrow D and thereby lifts the cover 20 from the conveyor device and fixes it in the cover receiver. In FIG. 11, the corresponding position is illustrated, in which the lower part 42 has been moved upwardly and the cover is now held fast in the cover receiver 42, 45 and is sealed from the outside environment. For the sealing from the outside environment, a seal 46 is provided above the cover in the cover receiver part 45, which seal cooperates edge wise with the upper side of the cover. At least one seal is likewise provided for the underside of the cover or in the lower part 42 of the cover receiver, which lower seal however is not shown in the Figure.

In the lower part 42 of the cover receiver is a pressure space 43 which comes to lie against the underside of the cover and into which space pressurized air (or possibly some other pressurized gas) can be introduced by way of a pressurized air connection 44. The measuring space is provided in the upper part 45 of the cover receiver and stands in connection with a pressure sensor 55. Therefore, if a testing pressure is introduced into the pressure space 43, for example, a testing pressure of 1 bar, an untight or leaky tear-off foil or heat sealing seam will lead to a pressure increase in the measuring space above the cover 20 measurable by the sensor 55. If a no leakage is present, no corresponding pressure increase measurable (within the range of measuring accuracy) occurs and the cover can be taken to be good.

In the case of tear-off covers with thin tear-off foils, which is usually the case, it is preferred to provide in the measuring space a support or prop for the tear-off foil so that the tear-off foil can not at all or at last can only partially bulge under the effect of the test pressure. In the case only a partial propping of the tear-off foil the measurement is then not made until after a corresponding small bulging of the tear-off cover has been stopped, in order that the actual leakage and not the air compression in the measuring space due to the bulging of the cover is measured.

In a preferred embodiment the measuring space portion above the tear-off foil is at least partially, preferably entirely, provided with a porous air permeable material which forms a rigid abutment surface for the tear-off foil so that the foil cannot deform under the influence of the testing pressure. This embodiment is shown in FIGS. 10 and 11 in which case the measuring space is formed by a thin plate 47 of porous material, the channel 48 in the plunger 54 and the channel and the space 49 in front of the sensor 55, and as the case may be, the small closed channel 53. The volumes or the partial volumes which make up the measuring space should be small in order, when leakage of the cover or of the heat seal occurs, to cause a well measurable pressure increase to arise in the measuring space. This is likewise achieved in that the material 47 substantially fills the measuring space, which material along with its abutment providing function for the tear-off foil also keeps the volume of the measuring space relatively small. As a preferred material 47 for forming the abutment surface in the measuring space a porous composite material is used which in itself is rigid and thereby permits no deflection of the tear-off foil and which on the other hand has a very high air permeability. Such materials are known and are for example porous air permeable ceramic materials or plastic materials. However, preferred is the use of a microporous air permeable aluminum material which is known by the name METAPOR® which is a composite material made of aluminum granules and epoxy resin and which is air permeable over the entire outer surface. This composite material is made and distributed by the firm Portec AG, CH-8404 in Winterthur Switzerland, and is available in suitable plate thicknesses for the present application. Instead of such a preferred microporous material, the abutment surface can also be made by an aperture grating, a rigid screen or some similar component by way of which a partial chamber of the measuring space is provided for collecting the leakage air.

In the illustrated example the measuring space along with the abutment surface forming material 47 is movable upwardly by means of the plunger 54, which has yet to be explained. This is however for the discussed leakage testing not necessary and the measuring space can also be formed directly in the upper cover receiving part 45 without the plunger 54. Correspondingly, in this case the channel 48 would be formed in the upper cover receiver part 45 and not in the plunger 54. The receiver part 45 is pushed downwardly, for example by springs 68, with stops 59 engagable with an apparatus fixed apart 62 limiting its downward movement. The spring loading produces a good sealing tightness for the cover receiver when the lower part 42 is moved upwardly and at its upper dead point slightly presses the upper part 45 upwardly against the springs 68 so as to produce a definite pressing force between the lower and upper cover receiver parts 42 and 45.

The measuring space is preferably open (by way of the channel 53 which leads into the free air) until the upper receiver part 45 is pressed somewhat upwardly, which then closes the channel 53 and thereby closes the measuring space. In this way, a remaining volume of air compressing in the measuring space is avoided and the measuring space is first closed when the cover has reached its measuring position. The test pressure in the test space 43 is turned on very shortly before the cover receiver part 42 reaches its upper dead point or very shortly after the reaching of that upper dead point. Thereafter, the pressure measurement is carried out during a standing still time at the upper dead point. It has been shown that in using a customary pressure sensor of the Firma Baumer, Switzerland, of type PCRF D016.14C.225 and a test pressure of 1 bar during the usual cycle time of the linear conveyor apparatuses fault spots in the sealing seam down to a diameter of 0.1 mm can be recognized by the corresponding pressure increase. By an increasing of the test pressure and/or the use of a more sensitive sensor 55 and/or by lengthening the stand still time or by increasing the cycle time of the cover manufacturing, the sensitivity or the ability to detect yet smaller leakage spots can be achieved. However, it has been shown that for most applications the ability to recognize leak spots in the region of 0.1 mm is sufficient.

After the measurement the testing pressure is removed from the test chamber 43, and the cover 20 by the downward movement of the cover receiver part 42 is again set onto the conveyor devices 30 and again transported by the conveyor device. The measured value assigned to the pressure increase then serves to separate the covers into those found to be leaky and those found to be tightly sealed and fit for further use. Accordingly, at the end of the conveyor device (or even before then) a cover can be ejected and assigned to waste or can be used as a correctly made cover. In the process of removing the covers from the test station 9 the procedure can also be such that first only the pressure delivery to the testing space 43 is interrupted and the clearing of the test space 43 occurs automatically with the moving down of the lower receiver part 42, so that thereby the compressed testing air escapes from under the cover. This escape of the testing air can also serve to have a cleaning function and for example to remove pieces of lacquer and the like, which could in the course of the next measurement impair the sealing tightness of the cover receiver. A light box can also be provided at the output of the conveyor device which light box determines whether the covers to be ejected as a result of the pressure testing have been actually ejected. The testing device 9 has now again reached the condition of FIG. 10 and is prepared for a renewed reception of a cover to be tested. In a normal operation there then always occurs a back and forth movement between the two dead point positions of FIG. 10 and FIG. 11 and the corresponding sealing tightness measurement. This movement can be effected by a non-illustrated drive such as well known to specialists in the art. Especially, the movement can be numerically controlled. The previously mentioned control 37 can accordingly effect the sequential steps of the testing procedure and the receipt of the measuring signals from the sensor 55.

FIGS. 12 and 13 show a preferred further development wherein the same test station in which the leakage measurement is carried out can also be used for a burst measurement. In the case of a burst measurement the tear-off foil is impacted with a pressure substantially higher than the usual test pressure and it is determined whether the sealing seam has a sufficient strength. Such a burst measurement is carried out during the manufacturing only occasionally in order to detect any eventual weakening of the sealing parameters which leads to an insufficient sealing of the tear-off foil. Should such weakening be determined during the run of a manufacturing batch all corresponding tear-off covers are to be taken as waste. According to the state of the art, finished covers are taken from the manufacturing line and are tested in a separate test apparatus; but in the case of the present preferred development, the burst testing now takes place in the same apparatus used for carrying out the leakage test.

In the FIG. 12, it is therefore again to be seen that a cover 20 is positioned for its reception into the test device, where here again the lower part of the cover receiver is in its lowered dead point. Similar reference numbers indicate the same elements which have already been described. Here however, the plunger 54 is moved upwardly, which is preferably performed by pressurized air, which through the connector 57 moves upwardly the holder 56 for the plunger 54. This can occur against a spring force or in such a way that normally the holder 56 and the plunger 54 are pressed downwardly by an associated super pressure in the chamber 63, so that the position of FIGS. 10 and 11 is taken, while now the chamber 63 is without pressure and the super pressure works on the underside of the holder 56 so that it in the chamber 69 effects the upward movement of the plunger 54. In FIG. 13 it is now seen how the cover is again air tightly clamped in the cover receiver 42, 45, with now an essentially larger measuring space portion 47' remaining free below the material 47, since the plunger 54 has been displaced upwardly. By the application of a bursting pressure of for example 2.5 bar, with this pressure naturally being chosen in accordance with the pre-given strength of the sealing seam, there now results a strong bulging of the tear-off foil related to the pressure. If the seal seam is strong enough to endure this bulging the sensor 55 will only measure the pressure increase which is the result of the compression of the air in the chamber 47' by the bulging. If on the other hand, the sealing seam is too weak, so that a burst itself occurs, the higher bursting pressure can be measured in the measuring space by the sensor 55. The involved cover, as well as perhaps the whole cover batch to which it belongs, is then to be considered as waste. By the carrying out of the burst testing in the manufacturing line, a substantial simplification of the burst testing is achieved.

In the case of a linear device 1, 30 for making tear-off covers 20 the tear-off covers are thereby tested as to the sealing tightness of the seal and of the foil itself by a test apparatus integrated into the linear device. For this the cover is clamped air tightly between a test pressure space and a measuring space and the cover is subjected on its underside to the test pressure. At its upper side, the cover is subjected to an air permeable propping in the measuring space and an air pressure increase caused by a possible sealing untightness can be sensed by a sensor and evaluated. In the same test apparatus, a burst test can also be made.

Although in the present application preferred embodiments of the invention have been described, it is to be clearly understood that the invention is not limited to these embodiments and that the invention can be carried out in other ways within the scope of the following claims.

The invention claimed is:

1. A method for the testing of the sealing tightness of a cover (20) closed by a tear-off foil (25), characterized in that the cover at its underside is subjected to a test pressure, in which the cover closes a pressure space (43) which is filled with a pressurized fluid, and in that at the upper side of the cover an increasing fluid pressure due to leakage of the cover is detected in a measuring space (47, 48, 49) associated with the upper side of the cover, and further characterized in that the tear-off foil (25) in the testing is supported against a bulging.

2. A method according to claim 1, further characterized in that a support occurs over substantially the entire surface of the tear-off foil.

3. A method according to claim 1, further characterized in that the tear-off foil is supported by a fluid permeable porous material (47).

4. A method according to claim 3, further characterized in that the material (47) fills a portion of the measuring space matching the size of the cover above the tear-off foil and in particular, forms an essentially planar and flat support surface for the tear-off foil.

5. The use of the method according to claim 1 for the testing of covers in a linear manufacturing device (1; 30) for the covers, and which manufacturing device has a number of processing stations, with the sealing tightness testing taking place within the linear transport path for the covers.

6. The use according to claim 5, wherein several linear manufacturing devices (30, 30') and sealing tightness testers are used in parallel to one another.

7. A method according to claim 1, further characterized in that optionally a burst test for the tear-off cover (25) is carried out with the same pressure space (43) with the pressure space being filled with fluid at a higher burst test pressure.

8. A method according to claim 7 further characterized in that in the case of the burst testing the support is removed at least at the edge regions of the tear-off foil and preferably is removed over the entire surface of the tear-off foil.

9. A method according to claim 7 further characterized in that in the case of the burst testing a measurement of the bursting pressure takes place, in particular taking into consideration the measuring space, which is also used for the sealing tightness measurement, in that the measuring space for the burst testing is enlarged.

10. An apparatus (9) for the sealing tightness testing of covers (20) provided with a tear-off foil (25), comprising a cover receiver (42, 45) with a pressure space (43) closed by a cover and having a fluid connection (44), a measuring space (47, 48, 49) closed by the cover, with the cover being fluid tightly receivable between the pressure space and the measuring space, and a fluid pressure sensor (55) which is in fluid pressure communication with the measuring space and produces an electrically evaluatable signal corresponding to the fluid pressure in the measuring space, wherein a prop is supported in the measuring space for the tear-off foil (25), which prop supports the tear-off foil against bulging during the sealing tightness testing.

11. The use of a testing apparatus according to claim 10 in a linear device for the making of covers with tear-off foils, wherein the testing apparatus together with a number of processing stations are arranged along a linear, especially a straight linear, transport path for the covers.

12. An apparatus according to claim 10, further characterized in that the apparatus has a lower cover receiver part (42) and an upper cover receiver part (45) which are movable relative to one another and which in a measuring position air tightly receive the cover between themselves, with the pressure space being arranged in the lower cover receiver part.

13. An apparatus according to claim 10, further characterized in that the supporting occurs essentially over the entire surface of the tear-off foil.

14. An apparatus according to claim 10, further characterized in that the tear-off foil is supported by a fluid permeable porous material (47).

15. An apparatus according to claim 14 further characterized in that the material (47) fills a portion of the measuring space matching the cover size above the tear-off foil and especially forms an essentially planar and flat support surface for the tear-off foil.

16. An apparatus according to claim 10 further characterized in that the apparatus is equipped for optionally carrying out a burst testing for the tear-off foil (25) within the same pressure space (43), with the pressure space being filled with fluid at a higher burst testing pressure.

17. An apparatus according to claim 16 further characterized in that the case of the burst testing the prop is removable at least in the edge region of the tear-off foil and preferably is removable from the entire surface of the tear-off foil.

18. An apparatus according to claim 16, further characterized in that in the case of the burst testing a measurement of the burst pressure takes place, especially taking into consideration the measuring space which was also used for the sealing tightness measurement, with the measuring space being enlargeable for the burst testing.

19. An apparatus according to claim 18, further characterized in that the measuring space is enlargeable by moving upwardly a portion of the measuring space so that at the testing location no supporting or only a partial supporting of the tear-off foil occurs.

* * * * *